April 20, 1926. 1,581,793
A. T. DAWSON ET AL
SIGHTING APPARATUS FOR ANTIAIRCRAFT ORDNANCE
Filed May 15, 1922  6 Sheets-Sheet 1
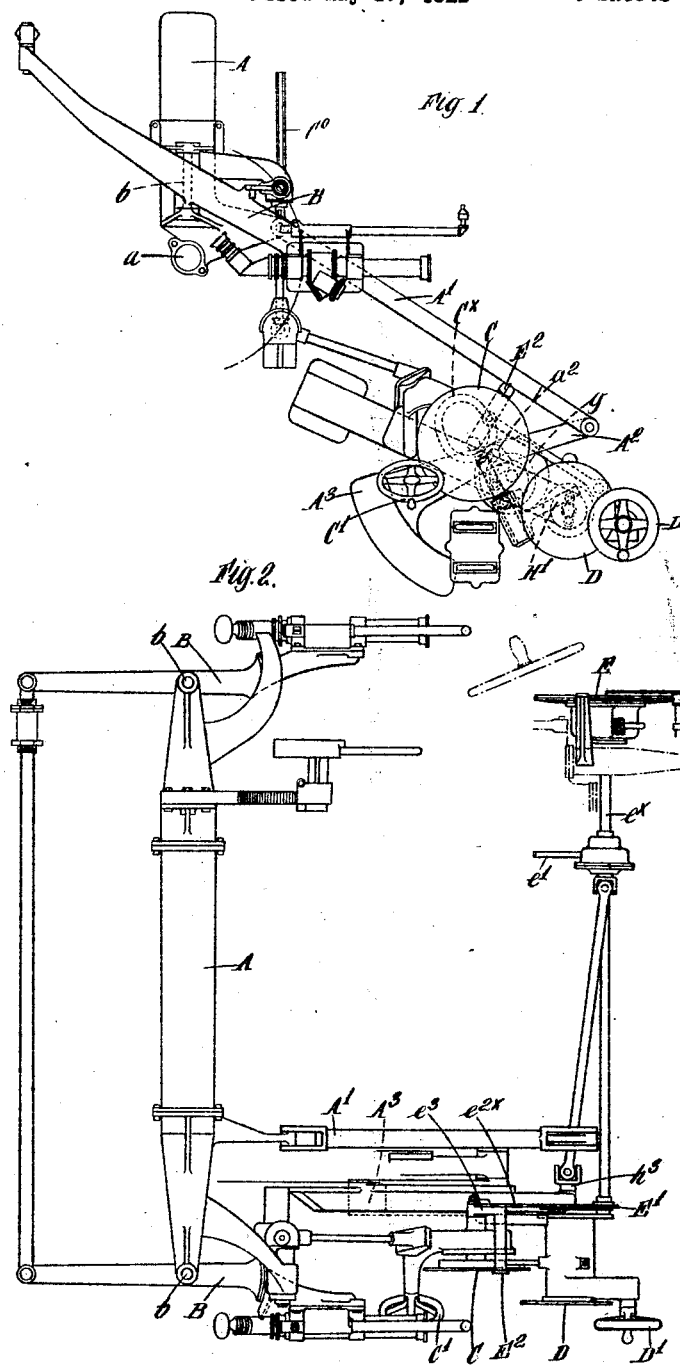

April 20, 1926.
A. T. DAWSON ET AL
1,581,793
SIGHTING APPARATUS FOR ANTIAIRCRAFT ORDNANCE
Filed May 15, 1922     6 Sheets-Sheet 2
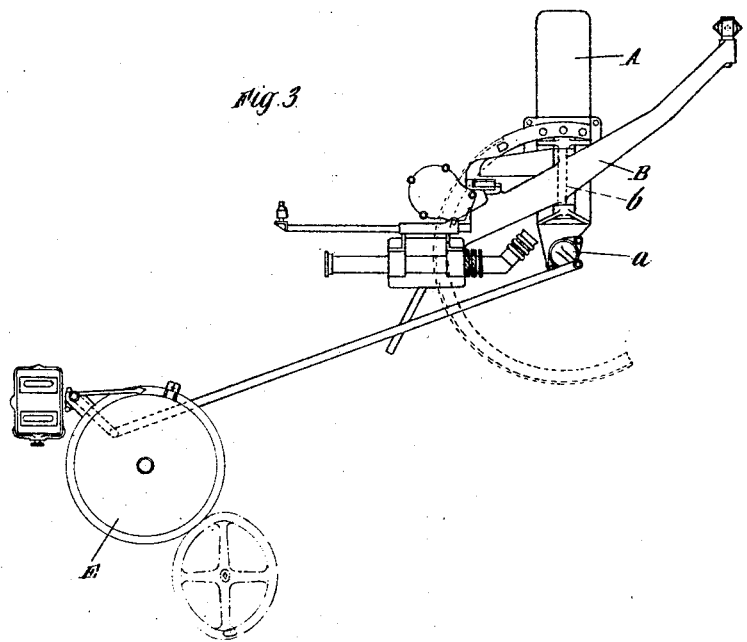

April 20, 1926. 1,581,793
A. T. DAWSON ET AL
SIGHTING APPARATUS FOR ANTIAIRCRAFT ORDNANCE
Filed May 15, 1922 6 Sheets-Sheet 3
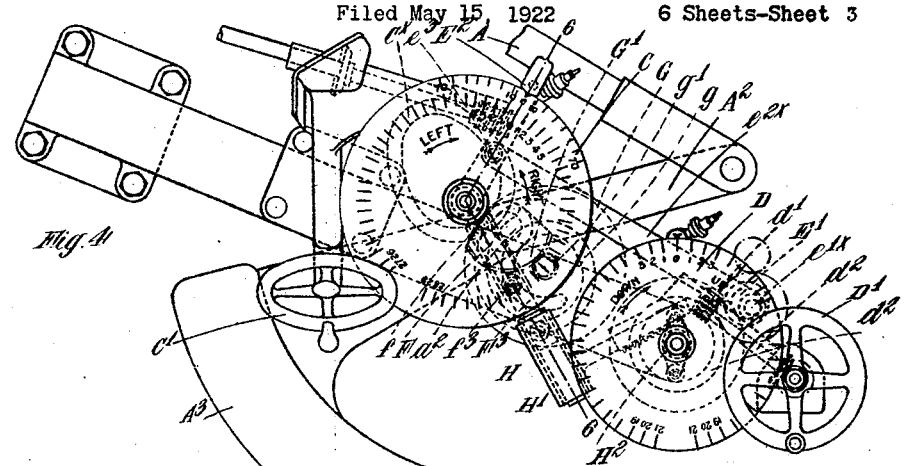
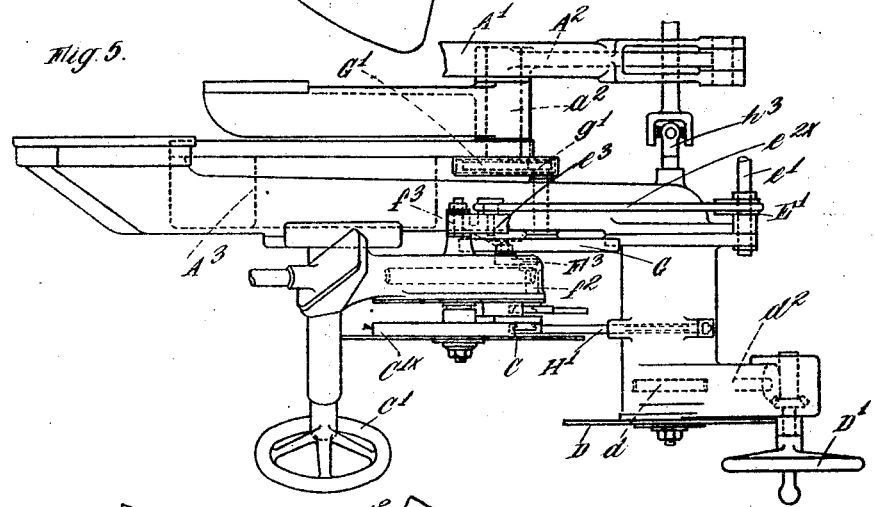
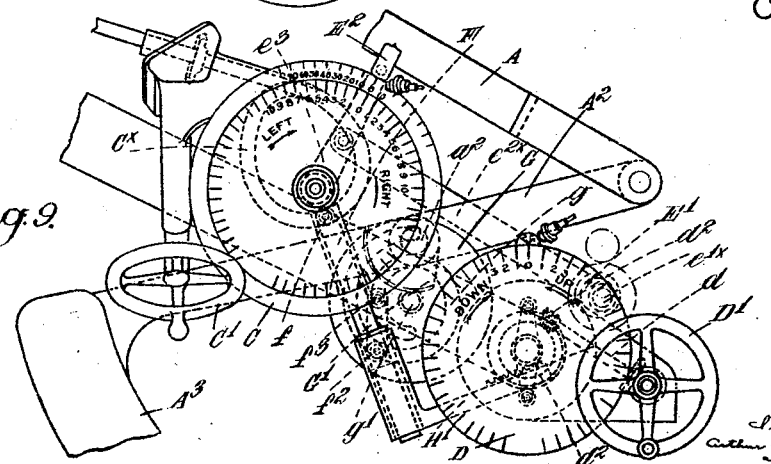

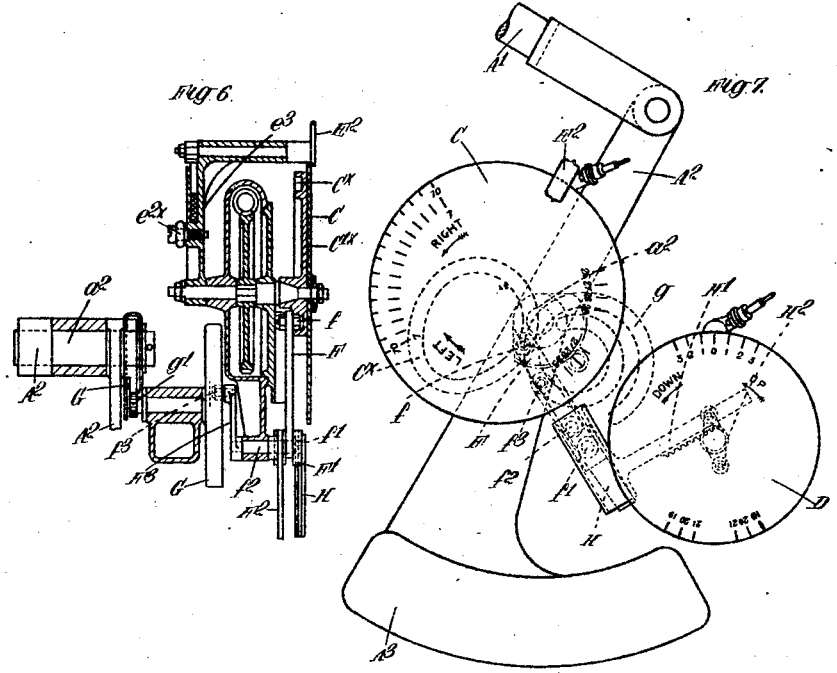
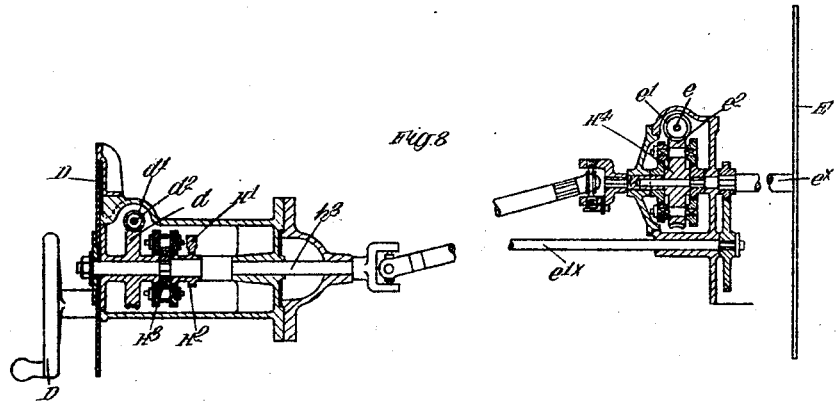
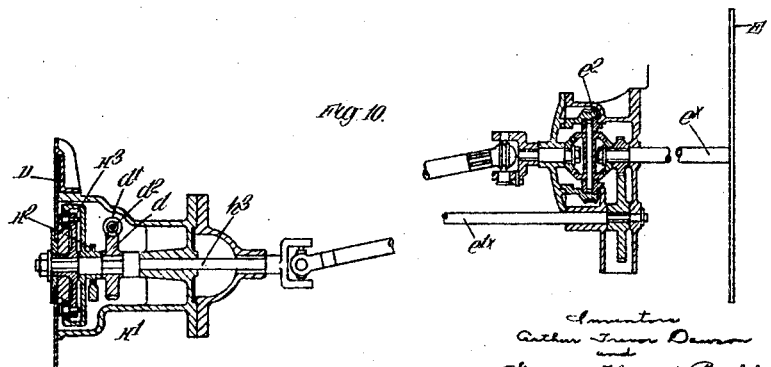

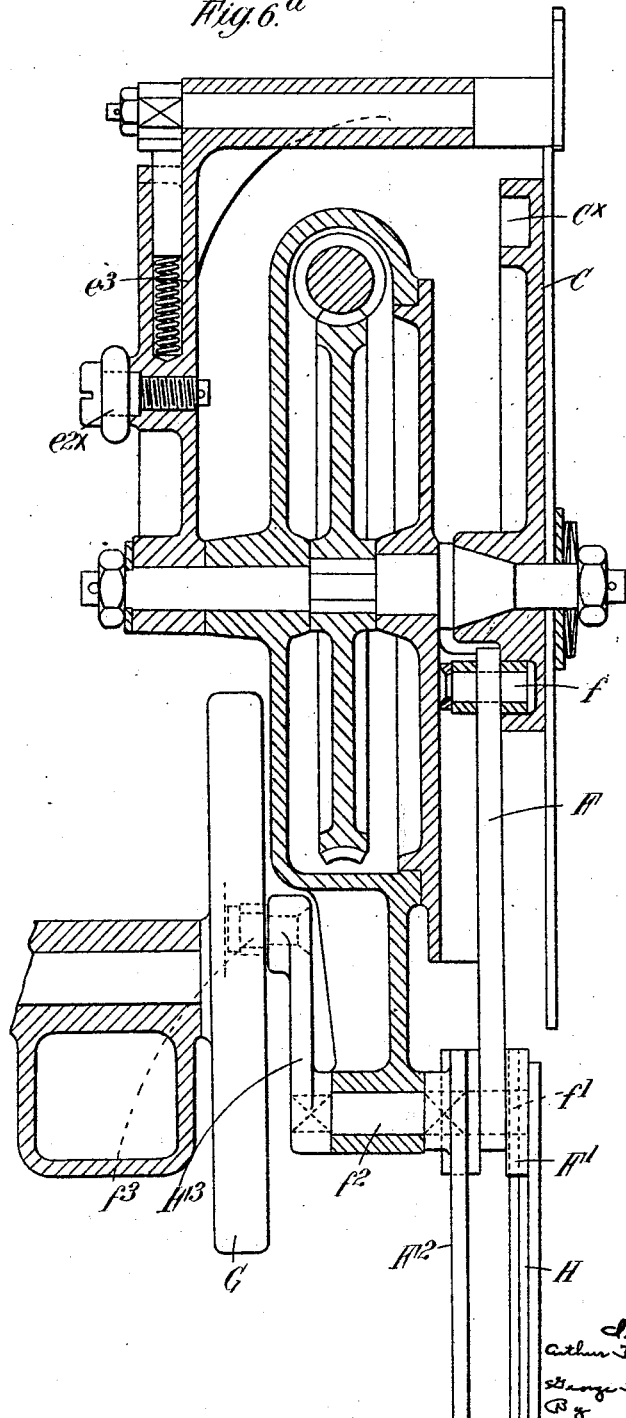

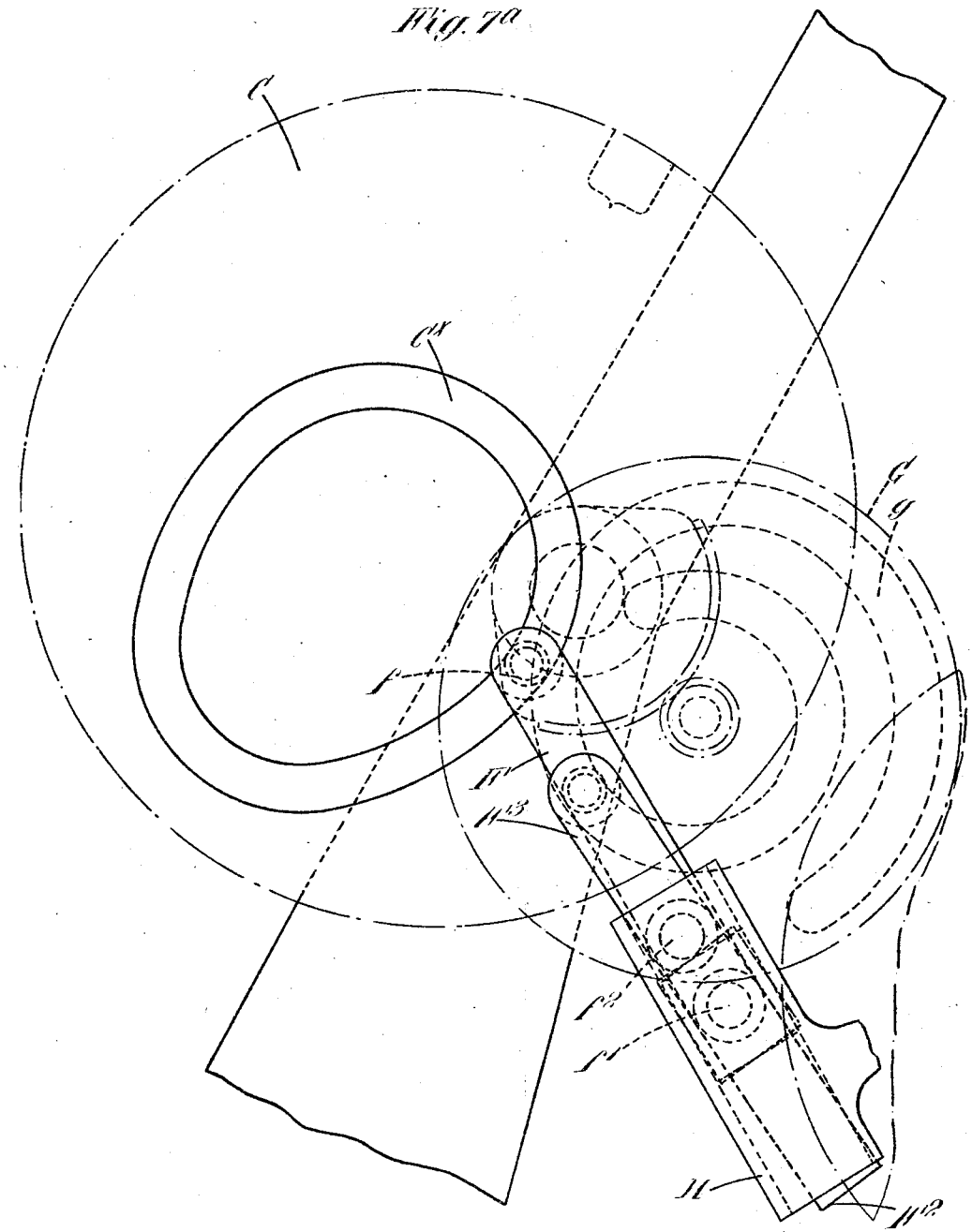

Patented Apr. 20, 1926.

1,581,793

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, LONDON, ENGLAND.

SIGHTING APPARATUS FOR ANTIAIRCRAFT ORDNANCE.

Application filed May 15, 1922. Serial No. 561,042.

*To all whom it may concern:*

Be it known that we, Sir ARTHUR TREVOR DAWSON, Bart., and Sir GEORGE THOMAS BUCKHAM, Knight, both subjects of the King of Great Britain, residing at Vickers House, Broadway, Westminster, in the county of London, England, have invented certain new and useful Improvements in or Relating to Sighting Apparatus for Antiaircraft Ordnance, of which the following is a specification.

This invention relates to sighting apparatus for antiaircraft ordnance in which the lateral movements of the sight relatively to the gun occur in the plane of the sight instead of in azimuth at all angles of elevation that is to say to sighting apparatus in which the sight carrier is connected to the sight bracket by a pivot which is parallel to the training axis of the gun only when the target is situated on the horizon. In such sighting apparatus it is found that when lateral deflection adjustment is given to the sight to compensate for the movement of an aerial target this adjustment (owing to the fact that the angle of sight decreases during the time of flight of the projectile and that the lateral movement of the sight relatively to the gun for deflection setting is not in the same plane as the combined movement of the gun and sight when relaying to bring the sight line once more on the target) introduces an error (known as the complementary error) in the vertical deflection setting of the sight. According to the present invention we provide mechanism whereby when the sight is adjusted for lateral deflection as stated above, the required correction to the vertical deflection setting will be given or indicated this correction being made dependent upon the amount of lateral deflection and the angle of sight. The said correction is obtained automatically by means of the said mechanism and may be superimposed automatically upon the gearing that effects the vertical deflection setting or the said mechanism may operate upon the indicating device of the vertical deflection gear so as to indicate the error whereupon resetting the vertical deflection gear effects the required correction. The correcting mechanism may comprise a suitably shaped cam moving with the lateral deflection dial and operating upon a link which displaces a sliding piece upon an oscillating lever. This lever may be oscillated by another cam in accordance with the angle of sight and the sliding piece may carry a guided bar having a rack. When the correction is to be superimposed upon the vertical deflection gear this rack meshes with a pinion which through a differential gear causes the vertical deflection shaft to rotate. The movement given to the rack and therefore to the vertical deflection shaft is thus dependent upon the amount of lateral deflection and the angle of sight. In the alternative arrangement in which the correcting mechanism operates upon the indicating device of the vertical deflection gear the aforesaid rack operates through a differential gear upon the vertical deflection dial so that the reading of the latter is altered and the desired correction is then effected by resetting the vertical deflection gear to bring the required graduation on the dial opposite the setting mark or pointer.

In order that the said invention may be clearly understood and readily carried into effect the same will now be described more fully with reference to the accompanying drawings in which—

Figure 1 is a side elevation, viewed from the right hand side of the gun, of a constructional form of sighting apparatus in accordance with our invention, Figure 2 is a plan of Figure 1, Figure 3 is a side elevation similar to Figure 1 but viewed from the left hand side of the gun, Figure 4 is a side elevation on a larger scale of the lower part of Figure 1 showing our improvements more clearly, Figure 5 is a plan of Figure 4, Figure 6 is a section taken approximately on the line 6, 6 of Figure 4, Figure 6$^A$ is a view showing on a larger scale the parts at the right hand portion of Figure 6.

Figure 7 is a view showing the essential parts of Figure 4 but occupying a different position, Figure 7$^A$ is a view showing on a larger scale the main parts of Figure 7.

Figure 8 is a sectional elevation showing the mechanism by which the aforesaid correction is superimposed upon the vertical deflection gear and upon the tangent elevation gear, Figure 9 is a view similar to Figure 4 showing a modified form of our invention, and Figure 10 is a view similar to Figure 8 showing how the correcting mechanism of Figure 9 operates upon the indicating device of the vertical deflection gear and how the latter operates upon the tangent elevation gear.

A is the sight bracket pivoted at $a$, $a$ coaxially with the gun trunnions and B, B are the sight carriers connected to the sight bracket by pivots $b$, $b$ the axes of which are situated in a transverse plane at right angles to the sight line at all angles of sight. In the examples shown the sight bracket A is connected by a link $A^1$ to a lever $A^2$ which is pivoted at $a^2$ to the gun carriage and has a weight $A^3$ for balancing the preponderating weight of the sight bracket (and the parts carried thereby) in front of its pivots $a$, $a$. C is the lateral deflection dial, $C^1$ the lateral deflection hand-wheel, D the vertical deflection dial, D' the vertical deflection hand-wheel and E the tangent elevation dial.

Referring first more particularly to Figures 1 to 8, $C^x$ is the aforesaid cam which moves with the lateral deflection dial C. This cam is in the form of a groove formed in a plate $C^{1x}$ (Figures 5 and 6) on the back of the said dial and receives a roller $f$ carried by a link F connected by a pivot $f^1$ to a member $F^1$ slidably mounted on an oscillating lever $F^2$. This lever is pivoted at $f^2$ to a fixed part and has an arm $F^3$ carrying a roller $f^3$ which engages with a cam groove $g$ formed in a disc G. The latter is moved angularly in accordance with the angle of sight, for example by a toothed quadrant $G^1$ which is carried by the axis pin $a^2$ of the aforesaid lever $A^2$ and meshes with a pinion $g^1$ on the axis pin of the disc G. The arrangement of the said parts is best seen in Figure 6. The said member F' carries a bar H having a rack $H^1$ at right angles thereto which meshes with a pinion $H^2$. This bar is of T cross-section and the stem slides in a slot in the gear casing. Normally the axis of the pivot $f^1$ and the axis of the pivot $f^2$ are in alignment as shown in Figures 4 and 6. When the lateral deflection dial C is rotated the cam groove $C^x$ causes the pivot $f^1$ to move away from the position of alignment by an amount dependent upon the lateral deflection adjustment as shown in Figure 7. Similarly when the angle of sight changes the cam groove $g$ causes the lever $F^2$ to rock through an angle dependent upon the angle of sight. Consequently the movement imparted to the bar H and thus to the rack $H^1$ and pinion $H^2$ will vary in accordance with the lateral deflection adjustment and the angle of sight. The cam grooves $C^x$, $g$, and their associated parts are so designed that the movement given to the pinion $H^2$ corresponds to the correction required to be given to the vertical deflection to compensate for the said factors.

The aforesaid pinion $H^2$ and a worm wheel $d$ (driven from a worm $d^1$ on a shaft $d^2$ operated by the vertical deflection hand-wheel $D^1$) are associated together by a differential gear $H^3$ (see Figure 8) so that a shaft $h^3$ is operated in accordance with the vertical deflection corrected by the amount of movement given to pinion $H^2$. The movement of this shaft $h^3$ is superimposed by means of a differential gear $H^4$ upon the movement given to the tangent elevation dial E by the tangent elevation gear (of which the shaft $e$, the worm $e^1$ and the worm wheel $e^2$ form part) so that the consequent resetting of the tangent elevation corrects the gun laying in the manner described in the specification of our prior United States Patent 1,364,546.

The shaft $e^x$ carrying the tangent elevation dial E drives a shaft $e^{1x}$ carrying an eccentric B' (see Figure 4) which operates through a rod $e^{2x}$ upon an arm $e^3$ carrying the index $E^2$ of the lateral deflection dial C as described in the specification of our United States Patent No. 1,481,859. The lateral deflection hand-wheel $C^1$ operates upon the portion of the lateral deflection gear interposed between the sight bracket and the sight carrier, through the intermediary of mechanism including a sliding shaft $C^o$ (Figure 1) as described in the specification of our other United States Patent No. 1,475,472.

The construction shown by Figures 9 and 10 is generally similar to that of Figures 1 to 8 except that the differential gear $H^3$ is interposed between the worm wheel $d$ and the vertical deflection dial D and that the rack $H^1$ engages with the reverse side of the pinion $H^2$. In this arrangement the correctional movement of the pinion $H^2$ is therefore imparted to the vertical deflection dial D instead of directly to the shaft $h^3$ and the tangent elevation dial E as in Figures 1 to 8. The desired correction is then effected by resetting the vertical deflection gear to bring the graduation corresponding to the required initial vertical deflection opposite the setting mark or pointer. In so doing correctional movement is imparted to the tangent elevation dial E.

The complementary error correction made in accordance with our invention should be accurate up to a certain maximum for any combination of lateral deflection and angle of sight and also for the maximum lateral deflection in combination with small angles of sight and for small amounts of lateral deflection when the angle of sight is large. To provide for this we may modify the apparatus by introducing a tension spring between the aforesaid lever A' and the cam member G. The expansion of this spring allows for any increased movement of the lateral deflection gear or of the cam member G beyond the point requiring the maximum correction. The spring is sufficiently strong to move the gearing and rotate the range dial but is weak enough to be overcome by the lateral deflection cam C×.

It is to be observed that in all cases the correction above referred to is a "down" deflection and that it takes place even when there is no vertical deflection on the sight.

Briefly stated the manner in which the sighting apparatus according to this invention is used is as follows:—The lateral deflection handwheel C' is operated so as to rotate the dial C and bring the graduation thereon corresponding to the known lateral deflection opposite the index E². This movement of the dial C causes the cam groove C× to shift the pivot f' out of alignment with the pivot f² as aforesaid by an amount dependent upon the deflection setting of the dial C. Change in the angle of sight of the target causes the lever F² pivoted at f² to be rocked by means of the cam groove g as aforesaid and the pinion H² receives an angular movement proportionate to the aforesaid complementary error which is dependent upon the particular angle of sight and the particular lateral deflection. This movement of the pinion H² is in Figures 1 to 8 added to the vertical deflection movements of the hand wheel D' by the differential gear H³ so that the vertical deflection adjustment of the shaft h³ is corrected for the said complementary error, whilst in Figures 9 and 10 the movement of the pinion H² is superimposed by the differential gear H³ upon the deflection dial D so that the complementary error correction is eventually effected by bringing the graduation on this dial corresponding to the vertical deflection, opposite the setting mark or pointer appertaining to this dial.

The herein described invention is equally applicable to ordnance having an independent line of sight and to ordnance not having an independent line of sight. When employed in connection with ordnance having an independent line of sight the invention may be used in conjunction with the features forming the subject of our prior United States Patent No. 1,364,546 as aforesaid or with those forming the subject of our prior United States Patent No. 1,386,460.

What we claim and desire to secure by Letters Patent of the United States is:—

1. In sighting apparatus for anti-aircraft ordnance, the combination of a sight mounted to move laterally at all angles of elevation in a plane containing the sight line, lateral deflection gear for moving the sight in the said plane, vertical deflection gear for effecting relative movement between the gun and the sight in the vertical plane, an adjustable element appertaining to the vertical deflection gear and means whereby the adjustment of the sight by said lateral deflection gear operates to move said element in accordance with the correction to be given to the vertical deflection setting to compensate for the complementary error in the said setting.

2. In sighting apparatus for anti-aircraft ordnance the combination of a sight mounted to move laterally at all angles of elevation in a plane containing the sight line, lateral deflection gear for moving the sight in the said plane, vertical deflection gear for effecting relative movement between the gun and the sight in the vertical plane, a cam operated by the lateral deflection gear, a cam moved in accordance with the angle of sight, a movable element appertaining to the vertical deflection gear and devices associated with said cams for causing said adjustable element to be moved in accordance with the complementary error in the vertical deflection setting based upon the lateral deflection and the angle of sight.

3. In sighting apparatus for anti-aircraft ordnance the combination of a sight mounted to move laterally at all angles of elevation in a plane containing the sight line, lateral deflection gear for moving the sight in the said plane, vertical deflection gear for effecting relative movement between the gun and the sight in the vertical plane, a cam operated by the lateral deflection gear, a cam moved in accordance with the angle of sight, a link actuated by the lateral deflection cam, a sliding member connected to said link, an oscillatory lever carrying said sliding member, means for operating said lever from the angle of sight cam, an adjustable element appertaining to said vertical deflection gear and means whereby said sliding member operates upon said element which is thereby moved in accordance with the correction to be given to the vertical deflection setting to compensate for the complementary error in the said setting.

4. In sighting apparatus for anti-aircraft ordnance, the combination of a sight mounted to move laterally at all angles of elevation in a plane containing the sight line lateral deflection gear for moving the sight in the said plane, vertical deflection gear for effecting relative movement between the gun and the sight in the vertical plane, and means whereby the adjustment of the sight by said lateral deflection gear operates to impart to the sight a correctional movement in the vertical plane to compensate for the complementary error in the vertical deflection setting.

5. In sighting apparatus for anti-aircraft ordnance the combination of a sight mounted to move laterally at all angles of elevation in a plane containing the sight line, lateral deflection gear for moving the sight in the said plane, vertical deflection gear for effecting relative movement between the gun and the sight in the vertical plane, a cam operated by the lateral deflection gear, a cam move in accordance with the angle of sight, devices associated with said cams and means whereby said devices operate to impart to the sight a correctional movement in the vertical plane to compensate for the complementary error in the vertical deflection setting.

6. In sighting apparatus for anti-aircraft ordnance the combination of a sight mounted to move laterally at all angles of elevation in a plane containing the sight line, lateral deflection gear for moving the sight in the said plane, vertical deflection gear for effecting relative movement between the gun and the sight in the vertical plane, tangent elevation gear for also effecting relative movement between the gun and the sight in the vertical plane, an indicator appertaining to said tangent elevation gear, means whereby said vertical deflection gear operates upon said tangent elevation indicator, an adjustable element associated with said vertical deflection gear, means whereby the adjustment of the sight by said lateral deflection gear operates to move said element in accordance with the correction to be given to the vertical deflection setting to compensate for the complementary error in the said setting, and differential gear associated with said vertical deflection gear and said element whereby the movements of said element are superimposed upon the movements given to said tangent elevation indicator by said vertical deflection gear.

7. In sighting apparatus for anti-aircraft ordnance, the combination of a sight mounted to move laterally at all angles of elevation in a plane containing the sight line, lateral deflection gear for moving the sight in the said plane, vertical deflection gear for effecting relative movement between the gun and the sight in the vertical plane, tangent elevation gear for also effecting relative movement between the gun and the sight in the vertical plane, an indicator appertaining to said tangent elevation gear, means whereby said vertical deflection gear operates upon said tangent elevation indicator, an adjustable element associated with said vertical deflection gear, a cam operated by the lateral deflection gear, a cam moved in accordance with the angle of sight, devices associated with said cams, means whereby said devices operate said element and differential gear associated with said vertical deflection gear and said element whereby the movements of said element are superimposed upon the movements given to said tangent elevation indicator by said vertical deflection gear.

8. In sighting apparatus for anti-aircraft ordnance, the combination of a sight mounted to move laterally at all angles of elevation in a plane containing the sight line, lateral deflection gear for moving the sight in the said plane, vertical deflection gear for effecting relative movement between the gun and the sight in the vertical plane, an indicating device appertaining to said vertical deflection gear and means whereby the adjustment of the sight by the said lateral deflection gear operates said indicating device in accordance with the correction to be given to the vertical deflection setting to compensate for the complementary error in the said setting.

9. In sighting apparatus for anti-aircraft ordnance, the combination of a sight mounted to move laterally at all angles of elevation in a plane containing the sight line, lateral deflection gear for moving the sight in the said plane, vertical deflection gear for effecting relative movement between the gun and the sight in the vertical plane, an indicating device associated with said vertical deflection gear, a cam operated by the lateral deflection gear, a cam moved in accordance with the angle of sight, devices associated with said cams and means whereby said devices operate said indicating device in accordance with the correction to be given to the vertical deflection setting to compensate for the complementary error in the said setting.

10. In sighting apparatus for anti-aircraft ordnance, the combination of a sight mounted to move laterally at all angles of elevation in a plane containing the sight line, lateral deflection gear for moving the sight in the said plane, vertical deflection gear for effecting relative movement between the gun and the sight in the vertical plane, an adjustable element appertaining to said vertical deflection gear, an indicating device appertaining to said vertical deflection gear and differential gear associated with said element and said vertical deflection gear whereby the movements of said element are superimposed on the movements given to said indicator by said vertical deflection gear.

11. In sighting apparatus for anti-aircraft ordnance, the combination of a sight mounted to move laterally at all angles of elevation in a plane containing the sight line, lateral deflection gear for moving the sight in the said plane, vertical deflection gear for effecting relative movement between the gun and the sight in the vertical plane, a cam operated by the lateral deflection gear, a cam moved in accordance with the angle of sight, devices associated with said cams, an adjustable element appertaining to the vertical deflection gear, means whereby said devices operate said element, an indicating device appertaining to said vertical deflection gear and differential gear associated with said element and said vertical deflection gear whereby the movements of said element are superimposed on the movements given to said indicator by said vertical deflection gear.

ARTHUR TREVOR DAWSON.
GEORGE THOMAS BUCKHAM.